United States Patent
Lee et al.

(10) Patent No.: US 10,536,023 B2
(45) Date of Patent: Jan. 14, 2020

(54) INTELLIGENT INSOLE MODULE

(71) Applicant: Goldtek Technology Co., Ltd., New Taipei (TW)

(72) Inventors: Lih-Sin Lee, Taipei (TW); Wang-Hung Chiang, Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 92 days.

(21) Appl. No.: 15/892,626

(22) Filed: Feb. 9, 2018

(65) Prior Publication Data

US 2019/0165594 A1    May 30, 2019

(30) Foreign Application Priority Data

Nov. 24, 2017    (TW) .............................. 106141069 A

(51) Int. Cl.

| | |
|---|---|
| *H02J 7/02* | (2016.01) |
| *A43B 3/00* | (2006.01) |
| *H02J 7/00* | (2006.01) |
| *G01C 22/00* | (2006.01) |
| *G01C 19/5783* | (2012.01) |
| *G01P 15/08* | (2006.01) |
| *A63B 24/00* | (2006.01) |
| *A43B 17/00* | (2006.01) |
| *H02J 50/10* | (2016.01) |
| *A43B 7/14* | (2006.01) |
| *A43B 5/06* | (2006.01) |
| *A43B 5/00* | (2006.01) |

(52) U.S. Cl.
CPC ............ *H02J 7/025* (2013.01); *A43B 3/0005* (2013.01); *A43B 7/142* (2013.01); *A43B 17/00* (2013.01); *A43B 17/003* (2013.01); *A63B 24/0062* (2013.01); *G01C 19/5783* (2013.01); *G01C 22/006* (2013.01); *G01P 15/0802* (2013.01); *H02J 7/0047* (2013.01); *H02J 50/10* (2016.02); *A43B 5/002* (2013.01); *A43B 5/06* (2013.01); *A63B 2207/02* (2013.01); *A63B 2220/17* (2013.01); *A63B 2220/40* (2013.01); *A63B 2220/803* (2013.01); *A63B 2220/836* (2013.01); *A63B 2225/50* (2013.01); *H02J 7/0042* (2013.01); *H02J 7/0054* (2013.01); *H02J 2007/005* (2013.01); *H02J 2007/0062* (2013.01)

(58) Field of Classification Search
CPC ............................... H02J 7/025; A43B 3/0005
USPC .......................................................... 320/108
See application file for complete search history.

(56) References Cited

U.S. PATENT DOCUMENTS

| | | | |
|---|---|---|---|
| 7,219,449 B1 * | 5/2007 | Hoffberg .............. | A43B 1/0054 36/29 |
| 10,231,505 B2 * | 3/2019 | Beers ................... | A43C 11/165 |

(Continued)

*Primary Examiner* — Jerry D Robbins
(74) *Attorney, Agent, or Firm* — ScienBiziP, P.C.

(57) ABSTRACT

The present disclosure provides an intelligent insole module. The intelligent insole module is placed inside an insole for tracking a user's exercise behavior. The intelligent insole module comprises a sensing unit, a wireless unit, a control unit and a power supply unit. The sensing unit detects an exercise information. The wireless unit transmits the exercise information. The control unit is connected to the sensing unit and the wireless unit, and controls the sensing unit and the wireless unit. The power supply unit is connected to the control unit, and supplies electricity to the intelligent insole module. The power supply unit comprises a magnetic charging structure.

9 Claims, 5 Drawing Sheets

(56) References Cited

U.S. PATENT DOCUMENTS

| | | | | |
|---|---|---|---|---|
| 2003/0227413 | A1* | 12/2003 | Yokota | H01Q 1/1271 |
| | | | | 343/713 |
| 2009/0193689 | A1* | 8/2009 | Galica | A43B 3/0005 |
| | | | | 36/137 |
| 2009/0273311 | A1* | 11/2009 | Beers | A43B 1/0036 |
| | | | | 320/108 |
| 2015/0257679 | A1* | 9/2015 | Ross | A61B 5/112 |
| | | | | 702/44 |
| 2018/0317597 | A1* | 11/2018 | Maxey | A43B 7/04 |

* cited by examiner

INTELLIGENT INSOLE MODULE

CROSS-REFERENCE TO RELATED APPLICATIONS

This application claims priority to Taiwan Patent Application No. 106141069, filed Nov. 24, 2017, the contents of which are incorporated by reference herein.

FIELD

The present disclosure generally relates to an intelligent insole module, especially to an intelligent insole module comprising a magnetic charging structure.

BACKGROUND

Wearable devices improve people's quality of life. Besides biological information, a wearable device can also keep a record of a user's exercise information. Accordingly, the user can learn the exercise behavior of himself or herself. An intelligent insole is a wearable device that can detect the movement of the user's feet to record the user's exercise information. The intelligent insole can be used for sports like running, hiking etc. Since the user's feet might be sweating during exercise and the user's shoes are occasionally under humid or dirty conditions, the intelligent insole is preferably waterproof and dust-proof. However, current intelligent insole is charged through contact charging, and therefore is not readily waterproof or dust-proof. Hence, the current intelligent insole is not reliable.

Therefore, a reliable intelligent module with good waterproof and dust-proof qualities is desired.

SUMMARY

In view of above, the object of the present disclosure is to provide an intelligent insole module. The intelligent insole module of the present disclosure uses a magnetic charging structure to avoid conventional contact charging (such as conventional micro USB connector or pogo pin connector). The magnetic charging structure provides waterproof and dust-proof capabilities to the charging port of the intelligent insole module. Also, the upper case and the bottom case of the intelligent insole module are integrated by an ultrasonic welding process. Accordingly, the whole structure of the intelligent insole module of the present disclosure is waterproof and dust-proof. The reliability and the lifetime of the intelligent insole module are improved. Moreover, the magnetic charging structure allows users to easily connect the intelligent insole module to a connector for charging and transmitting information. Meanwhile, the intelligent insole module uses a simplified antenna manufacturing process to reduce manufacture cost.

To achieve above object, the present disclosure provides an intelligent insole module. The intelligent insole module is placed inside an insole for tracking a user's exercise behavior. The intelligent insole module comprises a sensing unit, a wireless unit, a control unit and a power supply unit. The sensing unit detects an exercise information. The wireless unit transmits the exercise information. The control unit connects to the sensing unit and the wireless unit, and controls the sensing unit and the wireless unit. The power supply unit connects to the control unit, and supplies electricity to the intelligent insole module. The power supply unit comprises a magnetic charging structure.

BRIEF DESCRIPTION OF THE DRAWINGS

Implementations of the present technology will now be described, by way of example only, with reference to the attached figures.

DETAILED DESCRIPTION

Figure 1A:
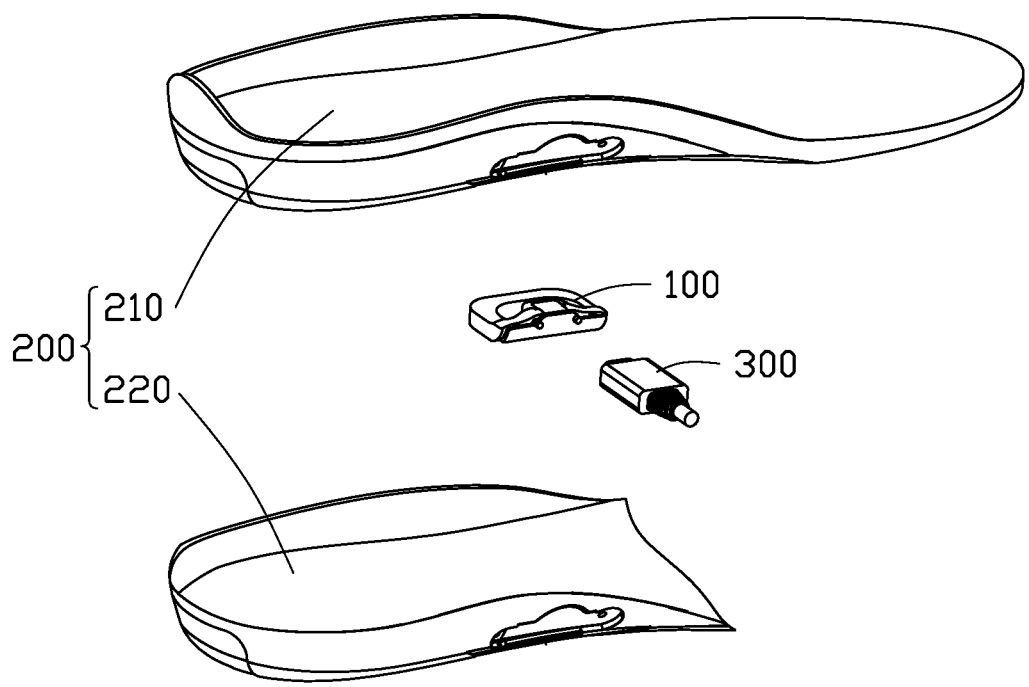
FIG. 1A is a schematic diagram of an exploded view of an intelligent insole.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein.

The description will be made as to the exemplary embodiments of the present disclosure in conjunction with the accompanying drawings in FIGS. 1A to 4B. Reference will be made to the drawing figures to describe the present disclosure in detail, wherein depicted elements are not necessarily shown to scale and wherein like or similar elements are designated by same or similar reference numeral through the several views and same or similar terminology.

Figure 1B:
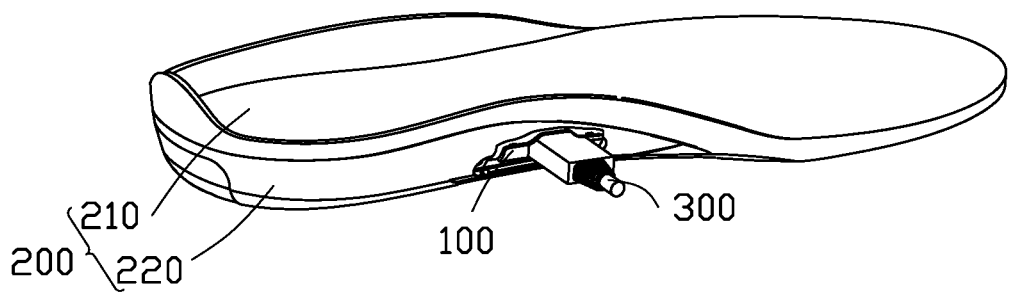
FIG. 1B is a schematic diagram of an assembled view of the intelligent insole of FIG. 1A.

Referring to FIGS. 1A and 1B, FIG. 1A is a schematic diagram of an exploded view of an intelligent insole; FIG. 1B is a schematic diagram of an assembled view of the intelligent insole of FIG. 1A. As shown in FIGS. 1A and 1B, the intelligent insole 10 comprises an insole 200, an intelligent insole module 100 and a magnetic charging connector 300. The intelligent insole module 100 is placed in the insole 200 for tracking a user's exercise behavior. The magnetic charging connector 300 charges the intelligent insole module 100. The power source of the magnetic charging connector 300 can be a mobile power bank or other electronic devices (not shown in the figures). The magnetic charging connector 300 may comprises an USB plug (not shown in the figures) for connecting to the power bank or other electronic devices. The magnetic charging connector 300 comprises a magnetic charging head for connecting to the intelligent insole module 100 and charging the intelligent insole module 100. The insole 200 comprises an upper pad 210 and a lower pad 220. The intelligent insole module 100 is placed between the upper pad 210 and the lower pad 220. Users can place the intelligent insole in their sports shoes. When the user exercises, the intelligent insole module 100 can monitor the movement of the user's feet for recording the user's exercise behavior.

Figure 2:
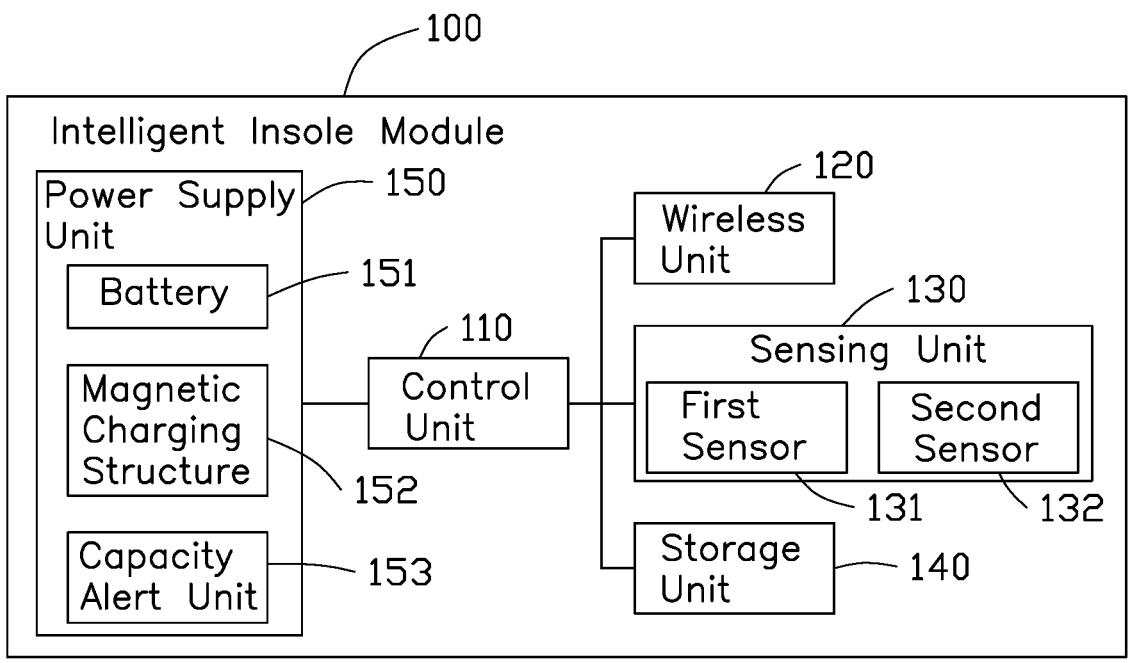
FIG. 2 is a block diagram of an intelligent insole module according to an exemplary embodiment of the present disclosure.

Referring to FIG. 2, FIG. 2 is a block diagram of an intelligent insole module according to an exemplary embodiment of the present disclosure. As shown in FIG. 2, the intelligent insole module 100 of the present disclosure is placed inside an insole, and tracks a user's exercise behavior. The intelligent insole module 100 comprises a sensing unit 130, a wireless unit 120, a control unit 110 and a power supply unit 150. The sensing unit 130 detects an exercise information. The wireless unit 120 transmits the exercise information. The control unit 110 is connected to the sensing unit 130 and the wireless unit 120, and controls the sensing unit 130 and the wireless unit 120. The power supply unit 150 is connected to the control unit 110, and supplies electricity to the intelligent insole module 100. The power supply unit 150 comprises a battery 151, a magnetic charging structure 152 and a capacity alert unit 153. The battery 151 stores and supplies electricity to the intelligent insole module 100. The battery 151 is charged through the magnetic charging structure 152. The capacity alert unit 153 detects current capacity of the battery 151. When current capacity of the battery 151 drops below a predetermined value, the capacity alert unit 153 produces an alert. The capacity alert unit 153 may comprise an LED light. When the battery 151 is getting charged, the LED light is red. When the battery 151 is fully charged, the LED light turns green. The sensing unit 130 comprises a first sensor 131 and a second sensor 132. The first sensor 131 is an acceleration sensor. The acceleration sensor counts paces of running or walking by detecting a change of acceleration of the user's body when the user is running or walking. The second sensor 132 is a gyro sensor. The gyro sensor detects orientation of the user's body when the user is exercising. Through the combination of the acceleration sensor and the gyro sensor, the intelligent insole module 100 can precisely detect the exercise information of the user. The intelligent insole module 100 further comprises a storage unit 140 for storing the exercise information. The wireless unit 120 can transmits the exercise information stored in the storage unit 140 to a mobile device (not shown in the figures, such as a smart phone) regularly or according to a user's request. The user can check his or her own exercise information by an intelligent insole APP on a mobile device.

Figure 3A:
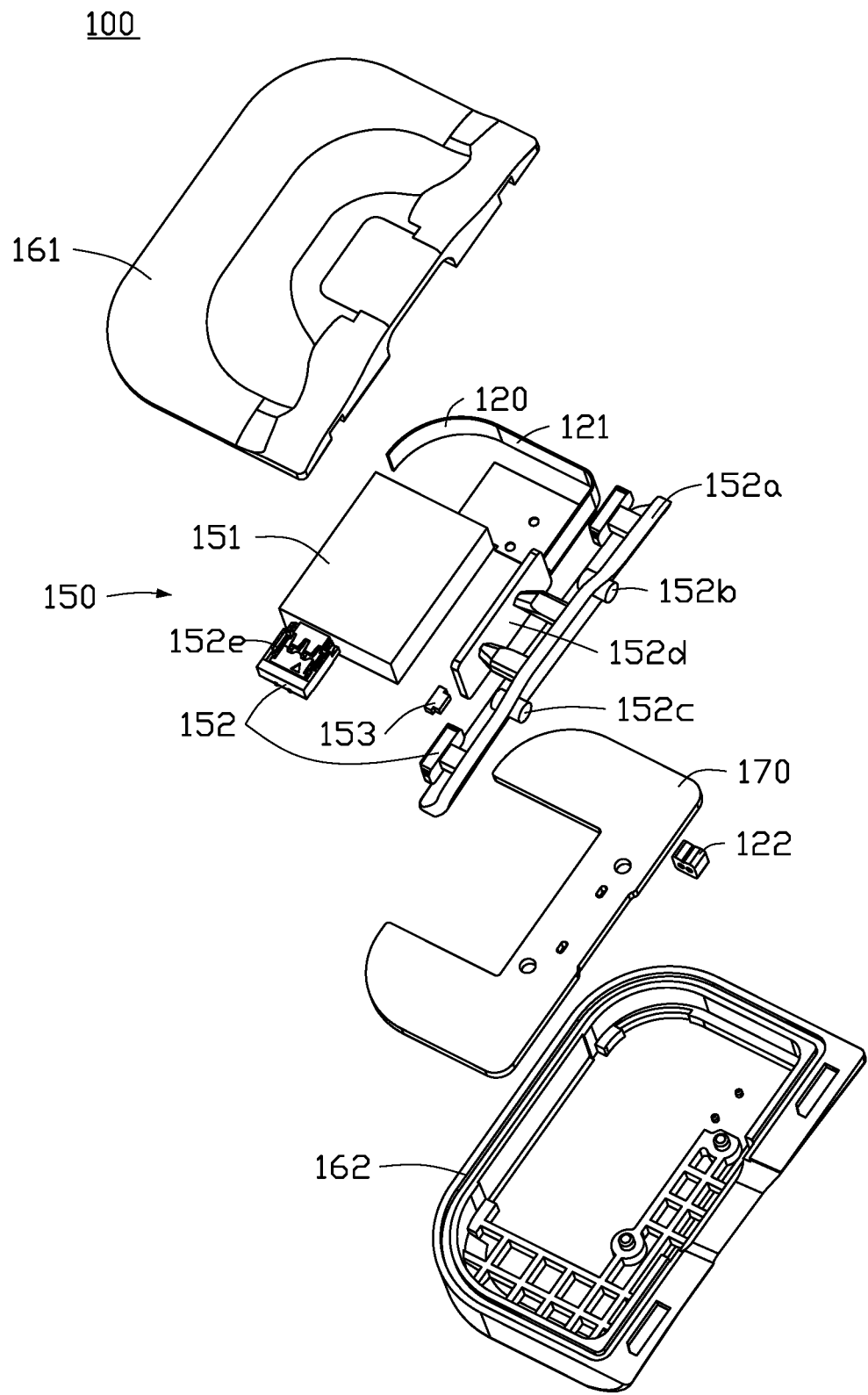
FIG. 3A is a schematic diagram of an exploded view of the intelligent insole module according to an exemplary embodiment of the present disclosure.
Figure 3B:
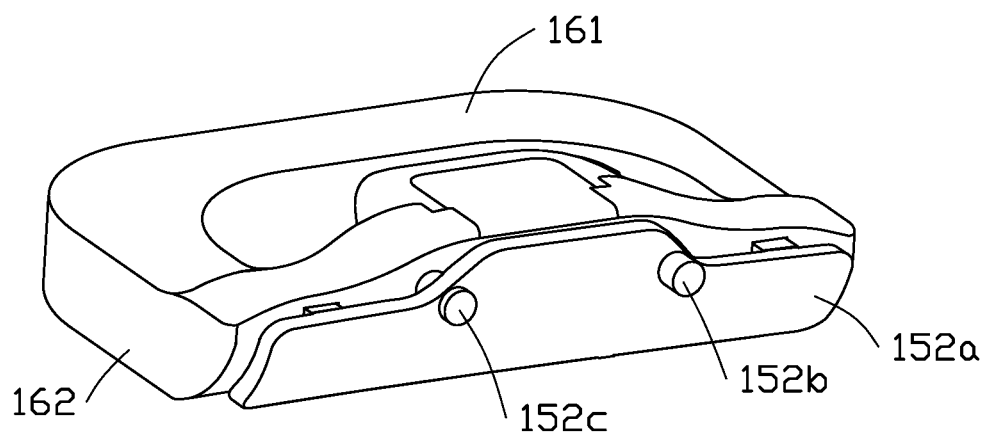
FIG. 3B is a schematic diagram of an assembled view of the intelligent insole module of FIG. 3A.

Referring to FIGS. 3A and 3B, FIG. 3A is a schematic diagram of an exploded view of the intelligent insole module according to an exemplary embodiment of the present disclosure; FIG. 3B is a schematic diagram of an assembled view of the intelligent insole module of FIG. 3A. As shown in FIGS. 3A and 3B, the intelligent insole module 100 further comprises an upper case 161 and a lower case 162. The control unit 110, the wireless unit 120, the sensing unit 130, the storage unit 140 and the power supply unit 150 of the intelligent insole module 100 are placed between the upper case 161 and the lower case 162. The upper case 161 and the lower case 162 are integrated using an ultrasonic welding process. Accordingly, the upper case 161 and the lower case 162 form an outer case that is waterproof and dust-proof and capable of protecting components therein.

The intelligent insole module 100 further comprises a printed circuit board 170. The wireless unit 120 and the power supply unit 150 are disposed on the printed circuit board 170. The magnetic charging structure 152 comprises a connecting member 152a, a charging interface 152d, a first magnet 152b and a second magnet 152c. The first magnet 152b and the second magnet 152c are affixed to the connecting member 152a. The connecting member 152a connects electrically to the battery 151. The charging interface 152d connects electrically to the charging member 152a. When the connecting member 152a connects to a magnetic charging connector (such as the magnetic charging connector 300 in FIG. 1A) to charge the battery 151, the first magnet 152b and the second magnet 152c force the connecting member 152a to attach to the magnetic charging connector by a magnetic force, charging the battery 151. The magnetic charging connector charges the battery 151 through the connecting member 152a and the charging interface 152d. The first magnet 152b and the second magnet 152c are made of magnetic metals. Besides forcing the connecting member 152a attach to the magnetic charging head of the magnetic charging connector by a magnetic force, the first magnet 152b and the second magnet 152c may also electrically connect to the magnetic charging head and the connecting member 152a for conducting current. The magnetic charging structure 152 further comprises a charging controller 152e connected to the battery 151. The charging controller 152e controls charging to the battery 151. The charging controller 152e can prevent overcharging to protect the battery 151.

As shown in FIG. 3B, when the intelligent insole module 100 is assembled, the upper case 161 and the bottom case 162 are integrated through an ultrasonic welding process to form an outer case that is waterproof and dust-proof. Referring to FIGS. 3A and 3B, the connecting member 152a, the first magnet 152b, and the second magnet 152c are exposed outside the outer case to connect to the magnetic charging connector. A structure of the connecting member 152a extends into the outer case formed by the upper case 161 and the bottom case 162, and connects electrically to the charging interface 152d.

As describe above, the intelligent insole module of the present disclosure uses a magnetic charging structure to avoid conventional contact charging (such as conventional micro USB connector or pogo pin connector). The magnetic charging structure provides waterproof and dust-proof capabilities to the charging port of the intelligent insole module. Also, the upper case and the bottom case of the intelligent insole module are integrated through an ultrasonic welding process. Accordingly, the whole structure of the intelligent insole module of the present disclosure is waterproof and dust-proof. The reliability and the lifetime of the intelligent insole module are improved. Moreover, the magnetic charging structure allows users to easily connect the intelligent insole module to a connector for charging and transmitting information.

Figure 4A:
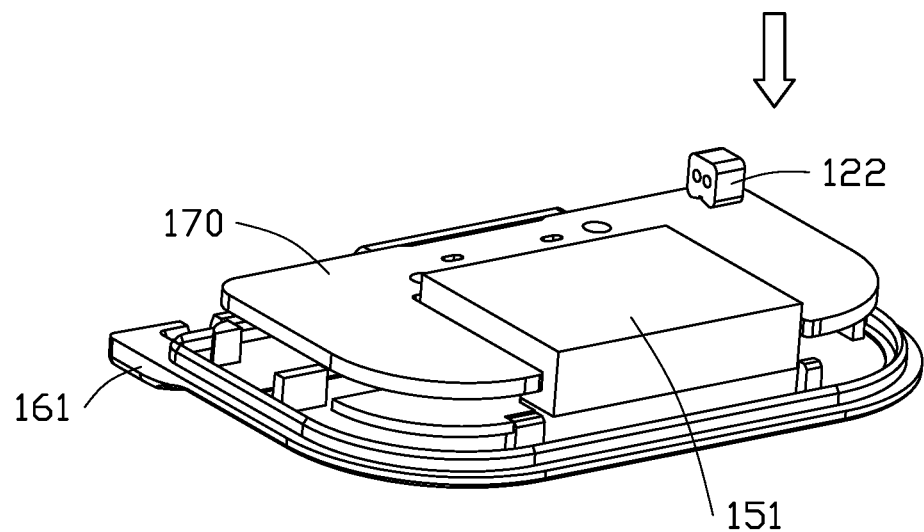
FIGS. 4A and 4B are schematic diagrams showing an assembling process of a wireless unit of the intelligent insole module according to an exemplary embodiment of the present disclosure.
Figure 4B:
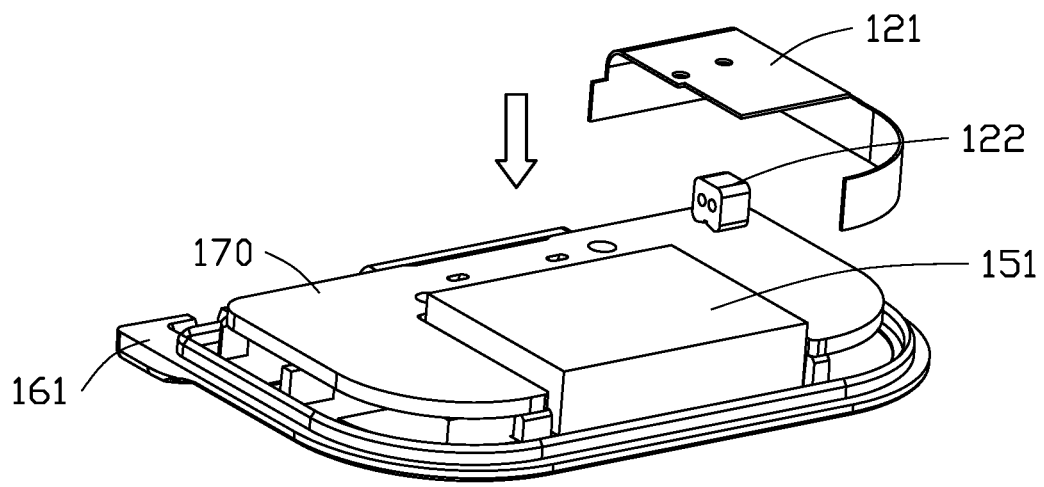

Referring to FIGS. 4A, and 4B, FIGS. 4A and 4B are schematic diagrams showing an assembling process of a wireless unit of the intelligent insole module according to an exemplary embodiment of the present disclosure. As shown in FIG. 4B, the wireless unit 120 of the intelligent insole module 100 comprises an antenna 121 and a conductive rubber 122. The antenna 121 electrically connects to the printed circuit board 170 through the conductive rubber 122. During a manufacture process, the conductive rubber 122 is attached to a backside of the printed circuit board 170 by a conductive glue (as shown in FIG. 4A, the printed circuit board 170 is upside down to show the backside thereof). Then, the antenna 121 is attached to the conductive rubber 122. Therefore, the antenna 121 is electrically connected to the printed circuit board 170 through the conductive rubber 122 (as shown in FIG. 4B). Accordingly, the manufacture process of the intelligent insole module can be simplified to reduce its manufacturing cost.

As described above, the intelligent insole module of the present disclosure uses a magnetic charging structure to avoid conventional contact charging (such as conventional micro USB connector or pogo pin connector). The magnetic charging structure provides waterproof and dust-proof capabilities to the charging port of the intelligent insole module. Also, the upper case and the bottom case of the intelligent insole module are integrated through an ultrasonic welding process. Accordingly, the whole structure of the intelligent insole module of the present disclosure is waterproof and dust-proof. The reliability and the lifetime of the intelligent insole module are improved. Moreover, the magnetic charging structure allows users easily connect the intelligent insole module to a connector for charging and transmitting information. Meanwhile, the intelligent insole module uses a simplified antenna manufacturing process to reduce manufacture cost.

The embodiments shown and described above are only examples. Many details are often found in the art such as the other features of an intelligent insole module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An intelligent insole module for tracking a user's exercise behavior, comprising:
    a sensing unit for detecting an exercise information;
    a wireless unit for transmitting the exercise information;
    a control unit connected to the sensing unit and the wireless unit; and
    a power supply unit connected to the control unit wherein the power supply unit comprises a battery for storing and supplying electricity; and
    a magnetic charging structure, comprising:
        a connecting member; and
        a first magnet and a second magnet wherein the first magnet and the second magnet are affixed on the connecting member and force the connecting member attach to a magnetic charging connector to charge the battery.

2. The intelligent insole module of claim 1, further comprising a storage unit for storing the exercise information.

3. The intelligent insole module of claim 1, wherein the power supply unit further comprises a capacity alert unit for producing an alert when current capacity of the battery is below a predetermined value.

4. The intelligent insole module of claim 1, wherein the magnetic charging structure further comprises a charging interface; and the charging interface is connected to the connecting member.

5. The intelligent insole module of claim 1, wherein the magnetic charging structure further comprises a charging controller connected to the battery; and the charging controller controls a charging current to the battery.

6. The intelligent insole module of claim 1, wherein the sensing unit comprises a first sensor and a second sensor; the first sensor is an acceleration sensor; and the second sensor is a gyro sensor.

7. The intelligent insole module of claim 1, further comprising a printed circuit board.

8. The intelligent insole module of claim 7, wherein the wireless unit comprises an antenna and a conductive rubber; and the antenna is connected to the printed circuit board through the conductive rubber.

9. The intelligent insole module of claim 1, further comprising an upper case and a bottom case; wherein the upper case and the bottom case are welded.

* * * * *